(12) United States Patent
Yacoub

(10) Patent No.: US 7,149,689 B2
(45) Date of Patent: Dec. 12, 2006

(54) TWO-ENGINE SPEECH RECOGNITION

(75) Inventor: Sherif Yacoub, Mountain View, CA (US)

(73) Assignee: Hewlett-Packard Development Company, LP., Houston, TX (US)

( * ) Notice: Subject to any disclaimer, the term of this patent is extended or adjusted under 35 U.S.C. 154(b) by 917 days.

(21) Appl. No.: 10/354,415

(22) Filed: Jan. 30, 2003

(65) Prior Publication Data

US 2004/0153319 A1    Aug. 5, 2004

(51) Int. Cl.
*G10L 15/28* (2006.01)

(52) U.S. Cl. ....................................... 704/255; 704/231
(58) Field of Classification Search ...................... None
See application file for complete search history.

(56) References Cited

U.S. PATENT DOCUMENTS

| | | | | |
|---|---|---|---|---|
| 4,817,156 A | * | 3/1989 | Bahl et al. ................ | 704/256.2 |
| 4,885,791 A | * | 12/1989 | Fujii et al. ................... | 704/254 |
| 5,164,990 A | * | 11/1992 | Pazienti et al. ............. | 704/253 |
| 5,381,513 A | * | 1/1995 | Tsuboka ...................... | 704/232 |
| 6,137,863 A | * | 10/2000 | Brown et al. ............ | 379/88.01 |

* cited by examiner

*Primary Examiner*—David D. Knepper

(57) ABSTRACT

A speech recognition system comprises exactly two automated speech recognition (ASR) engines connected to receive the same inputs. Each engine produces a recognition output, a hypothesis. The system implements one of two (or both) methods for combining the output of the two engines. In one method, a confusion matrix statistically generated for each speech recognition engine is converted into an alternatives matrix in which every column is ordered by highest-to-lowest probability. A program loop is set up in which the recognition outputs of the speech recognition engines are cross-compared with the alternatives matrices. If the output from the first ASR engine matches an alternative, its output is adopted as the final output. If the vectors provided by the alternatives matrices are exhausted without finding a match, the output from the first speech recognition engine is adopted as the final output. In a second method, the confusion matrix for each ASR engine is converted into Bayesian probability matrix.

7 Claims, 2 Drawing Sheets

TWO-ENGINE SPEECH RECOGNITION

FIELD OF THE INVENTION

The present invention relates to automated speech recognition systems, and more specifically to systems that combine two speech recognition engines to improve both the recognition and error rates at a lower cost overall.

BACKGROUND OF THE INVENTION

E. W. Brown, et al., observe that humans understand speech with ease and use speech to express complex ideas, information, and knowledge. See, *IBM Systems Journal*, Volume 40, Number 4, 2001, which is accessible at http://www.research.ibm.com/journal/sj/404/brown.html. Unfortunately, automatic speech recognition with computers is very hard, and extracting knowledge from speech is even more difficult. Nevertheless, the potential reward for solving this problem is worth the effort. Major speech recognition applications include dictation or document creation systems, navigation or transactional systems such as automated interactive voice response systems, and multimedia indexing systems.

In dictation systems, the words spoken by a user are transcribed verbatim into text to create documents, e.g., personal letters, business correspondence, etc. In navigation systems, the words spoken by a user may be used to follow links on the Web or to navigate around an application. In transactional systems, the words spoken by a user are used to conduct a transaction such as a stock purchase, banking transaction, etc. In multimedia indexing systems, speech is used to transcribe the audio into text, and subsequently, information retrieval techniques are applied to create an index with time offsets into the audio. Advances in technology are making significant progress toward the goal of allowing any individual to speak naturally to a computer on any topic and have the computer accurately understand what was said. However, we are not there yet. Even state-of-the-art continuous speech recognition systems require the user to speak clearly, enunciate each syllable properly, and have his or her thoughts in order before starting. Factors inhibiting the pervasive use of speech technology today include the lack of general-purpose, high-accuracy continuous-speech recognition, lack of systems that support the synergistic use of speech input with other forms of input, and challenges associated with designing speech user interfaces that can increase user productivity while being tolerant of speech recognition inaccuracies.

Speech recognition systems are typically based on hidden Markov models (HMM's), used to represent speech events, e.g., a word, statistically, and where model parameters are trained on a large speech database. Given a trained set of HMM's, there exists an efficient algorithm for finding the most likely word sequence when presented with unknown speech data. The recognition vocabulary and vocabulary size play a key role in determining the accuracy of a system. A vocabulary defines the set of words or phrases that can be recognized by a speech engine. A small vocabulary system may limit itself to a few hundred words, whereas a large vocabulary system may consist of tens of thousands of words. Dictation systems are typically large vocabulary applications, whereas navigation and transactional systems are typically small vocabulary applications. Multimedia indexing systems could be either large vocabulary or small vocabulary applications.

E. W. Brown, et al., further say that speech recognition accuracy is typically scored in terms of word error rate (WER). Such can be defined to be the sum of word insertion, substitution, and deletion errors divided by the total number of correctly decoded words. The WER can vary dramatically depending on the nature of the audio recordings.

Speech recognition engines therefore produce flawed results. Voting mechanisms have been constructed to tie the output of many speech recognition engines together, and adopt the result that the majority agrees on, word-by-word. It made no sense in the past to use only two speech recognition engines together in a voting scheme, because there could occur a split decision 1:1.

Some telephony applications use speech recognition engines, e.g., interactive voice response systems like those that offer travel information for an airline. The airline responds with voice-driven flight information by simply asking the user to voice their flight number, or departure and arrival information. Other applications include voice-enabled banking and dialing by voice, e.g., as offered by cellular phone service providers.

Conventional multi-engine speech recognition systems combine three or more ASR engines in a voting arrangement. The combining of the output of only two ASR engines for improvements in the accuracy and decreases in the error rate is not being taught.

Prior work on the combination of automated speech recognition engines depends on the use of three or more ASR engines, never only two. Although the recognition accuracy improves as the number of ASR engines used in the combination increases, using more engines comes at a cost in resources, size, expense, and complexity.

Automatic speech recognition (ASR) engines are far from perfect. The variability in speakers, noise, and delivery rates and styles can confuse the computer processing. So the outputs provided by ASR engines are never very certain, there is always an element of guessing involved. The degree of guessing often varies with the word or sound being attempted in the recognition. Batteries of tests can be conducted on particular ASR engines using various standardized word sets to help characterize and document the recognition accuracy. Such data can be distilled into a "confusion matrix" in which the actual inputs are tabulated against the hypothesized outputs.

Confusion matrices, as used in speech recognition systems, are charts that statistically plot the word or sound recognized versus the word or sound actually input. Confusion matrices have been used in prior art devices for correcting the output from the optical character recognition systems, e.g., as described by Randy Goldberg in U.S. Pat. No. 6,205,261; and in handwritten character recognition, as described by Fujisaki, et al., in U.S. Pat. No. 5,963,666. In U.S. Pat. No. 6,400,805, Brown, et al., describe using a confusion matrix to limit alphanumeric grammar searches.

SUMMARY OF THE INVENTION

An object of the present invention is to provide a method for combining two automated speech recognition engines.

Another object of the present invention is to provide a method for generating a confusion matrices for speech recognition engines.

A further object of the present invention is to provide a system for combination and confusion matrices generation.

An object of the present invention is to provide a method for limited vocabulary recognition useful in voice-enabled telephony applications and interactive voice response (IVR) systems.

Briefly, a speech recognition embodiment of the present invention comprises exactly two speech recognition engines connected to receive the same inputs. Each engine produces a recognition output, a hypothesis. A confusion matrix statistically generated for each speech recognition engine is converted into an alternatives matrix in which every column is ordered by highest-to-lowest probability. A program loop is set up in which the recognition outputs of the speech recognition engines are cross-compared with the alternatives matrices. If the first speech recognition engine finds a match, its output is adopted as the final output. If the vectors provided by the alternatives matrices are exhausted without finding a match, the output from the first speech recognition engine is adopted as the final output.

An advantage of the present invention is that speech recognition systems are provided that are inexpensive, higher performing, etc.

Another advantage of the present invention is that a two-engine speech recognition system is provided that has a faster response time than many three-engine, voting-mechanism automated speech recognition types.

A further advantage of the present invention is that a speech recognition system is provided that reduces costs by requiring fewer licensed recognition engines. The cost of the combination system is directly proportional to the number of ASR engines used in the combination method.

A still further advantage of the present invention is that a speech recognition system is provided that improves performance because processor resources are spread across fewer executing ASR engines. Systems using the present invention will be faster and will have a shorter response time.

Another advantage of the present invention is that a speech recognition system is provided that improves accuracy other combination systems that use multiple engines, as measured by their respective word error rats (WER).

These and other objects and advantages of the present invention will no doubt become obvious to those of ordinary skill in the art after having read the following detailed description of the preferred embodiment as illustrated in the drawing figures.

DETAILED DESCRIPTION OF THE EMBODIMENTS

Figure 1:
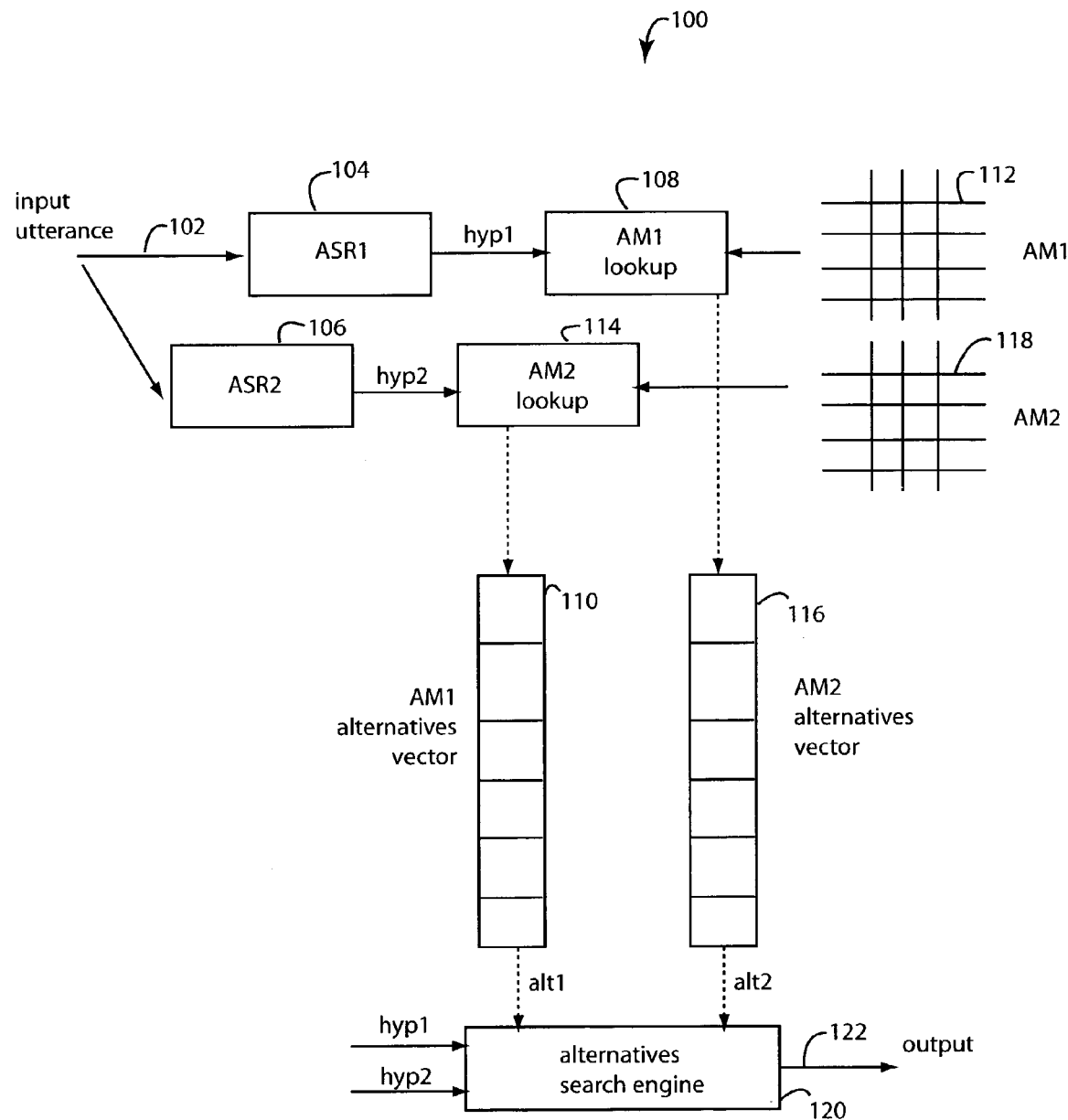
FIG. 1 is a functional block diagram of a first speech recognition system embodiment of the present invention which uses an independent ordering of hypothesis alternatives.

FIG. 1 illustrates a first speech recognition system embodiment of the present invention, and is referred to herein by the general reference numeral 100. The system 100 uses an independent ordering of hypothesis alternatives, and comprises an utterance input 102 to be recognized that is provided as an input to both a first automated speech recognition engine (ASR1) 104, and a second automated speech recognition engine (ASR2) 106. Each automated speech recognition engine 104 and 106 will output a hypothesis for each utterance input. A hypothesis-one (hyp-1) from ASR1 104 and hypothesis-two (hyp-2) from ASR2 106 may or may not agree. If they do agree, the solution is simple. But if they disagree, then some more complex decision must be made because it otherwise appears to be a tie-vote.

Embodiments of the present invention generate an alternatives matrix (AM) from a confusion matrix (CM) associated with each automated speech recognition engine 104 and 106. A confusion matrix is a statistical representation of the errors that were made by an automated speech recognition engine during tests. The dimensions are equal to the number of vocabulary words in the grammar.

A typical CM uses the columns to represent the hypothesis output generated by an automated speech recognition engine, and the rows represent the correct output, e.g., the ground truth. For example, see Table I which diagrams a CM with a simple grammar of only four vocabulary words. The cells are each loaded with a statistic that represents how many times the particular output occurred for a particular input. For example, and output of "zero" occurred 100-times when the input really was "zero". But and output of "zero" occurred two times when the input was "one". And an output of "zero" never occurred when the input was "two". An output of "zero" occurred three times when the input was "three".

TABLE I

| Confusion Matrix | | | | |
|---|---|---|---|---|
| | zero | one | two | three |
| zero | 100 | 0 | 0 | 0 |
| one | 2 | 400 | 2 | 5 |
| two | 0 | 3 | 200 | 3 |
| three | 3 | 5 | 3 | 255 |

Therefore, if the output is "zero", the far most probable truth is the input was really "zero", followed by the much remoter possibilities of "three", "one", and "two", in that order. The same holds true for all the other columns. But what differs from column-to-column is the cell position of the most probable value. In the matrix, the cell position of the most probable values form a diagonal.

A hypothesis-one (hyp-1) from ASR1 104 is used by an AM1-lookup process 108 to fetch an AM1 alternatives vector 110 a column from an alternative matrix (AM1) 112. The AM1 alternatives vector 110 is a whole column right out of the alternative matrix (AM1) 112. A hypothesis-two (hyp-2) from ASR2 106 is used by an AM2-lookup process 114 to fetch an AM2 alternatives vector 116 from an alternative matrix (AM1) 118. The AM2 alternatives vector 116 is a whole column right out of the alternative matrix (AM2) 118.

Embodiments of the present invention transform each confusion matrix (CM) into an alternatives matrix. Consider the CM of Table-II.

TABLE II

| Confusion Matrix | | | |
|---|---|---|---|
| | zero | one | two |
| zero | 100 | 0 | 0 |
| one | 2 | 400 | 2 |

TABLE II-continued

Confusion Matrix

| | zero | one | two |
|---|---|---|---|
| two | 0 | 3 | 200 |
| three | 3 | 5 | 3 |

Such CM is separated into its individual columns.

TABLES III, IV, and V

| zero | | one | | two | |
|---|---|---|---|---|---|
| zero | 100 | zero | 0 | zero | 0 |
| one | 2 | one | 400 | one | 2 |
| two | 0 | two | 3 | two | 200 |
| three | 3 | three | 5 | three | 3 |

Each column is then sorted by row and ordered according to CM cell value, e.g., highest value cell at the top, the second one next to the top, etc. The row labeling for the respective cells are moved too.

TABLES VI, VII, and VIII

| zero | | one | | two | |
|---|---|---|---|---|---|
| zero | 100 | one | 400 | two | 200 |
| three | 3 | three | 5 | three | 3 |
| one | 2 | two | 3 | one | 2 |
| two | 0 | zero | 0 | zero | 0 |

Then the row labels are moved inside the cells and the original numeric values discarded. Such cell numeric values only served to order each column. The constituent columns are then reassembled to form an alternative matrix (AM).

TABLE IX

Alternative Matrix

| zero | one | two |
|---|---|---|
| zero | one | two |
| three | three | three |
| one | two | one |
| two | zero | zero |

The resulting AM is consistently ordered in each column for each output hypothesis.

Referring now to FIG. 1, each ASR engine 104 and 106 will produce a hypothesis (hyp1 and hyp2) for a given input utterance. An alternatives search engine 120 selects either hyp1 or hyp2, with hyp1 being slightly preferred, as an output 122. Each pair of hyp1 and hyp2 values fetches a whole column of alternatives vectors 110 and 116. A program loop is setup up in which the first pass compares hyp1 with the first, most probable entry in AM2 alternatives vector 116 (alt2). If equal, then alternatives search engine 120 selects output=hyp1. If not, then hyp2 is compared with alt1, if equal then alternatives search engine 120 selects output=hyp2. Otherwise, the loop counter is incremented and the next two entries are tested and the process repeats. if this doesn't resolve by the time the loop counter rolls over, then alternatives search engine 120 selects output=hyp1.

Therefore, the first recognition engine ASR1 104, is the reference engine. This preference is manifested in two important ways, ASR1's hypothesis is the first one to be compared with the alternatives and adopted if a match is found, and its output is used as the final output if no match exists in either engine between the hypothesis and the alternatives in the vectors.

Figure 2:
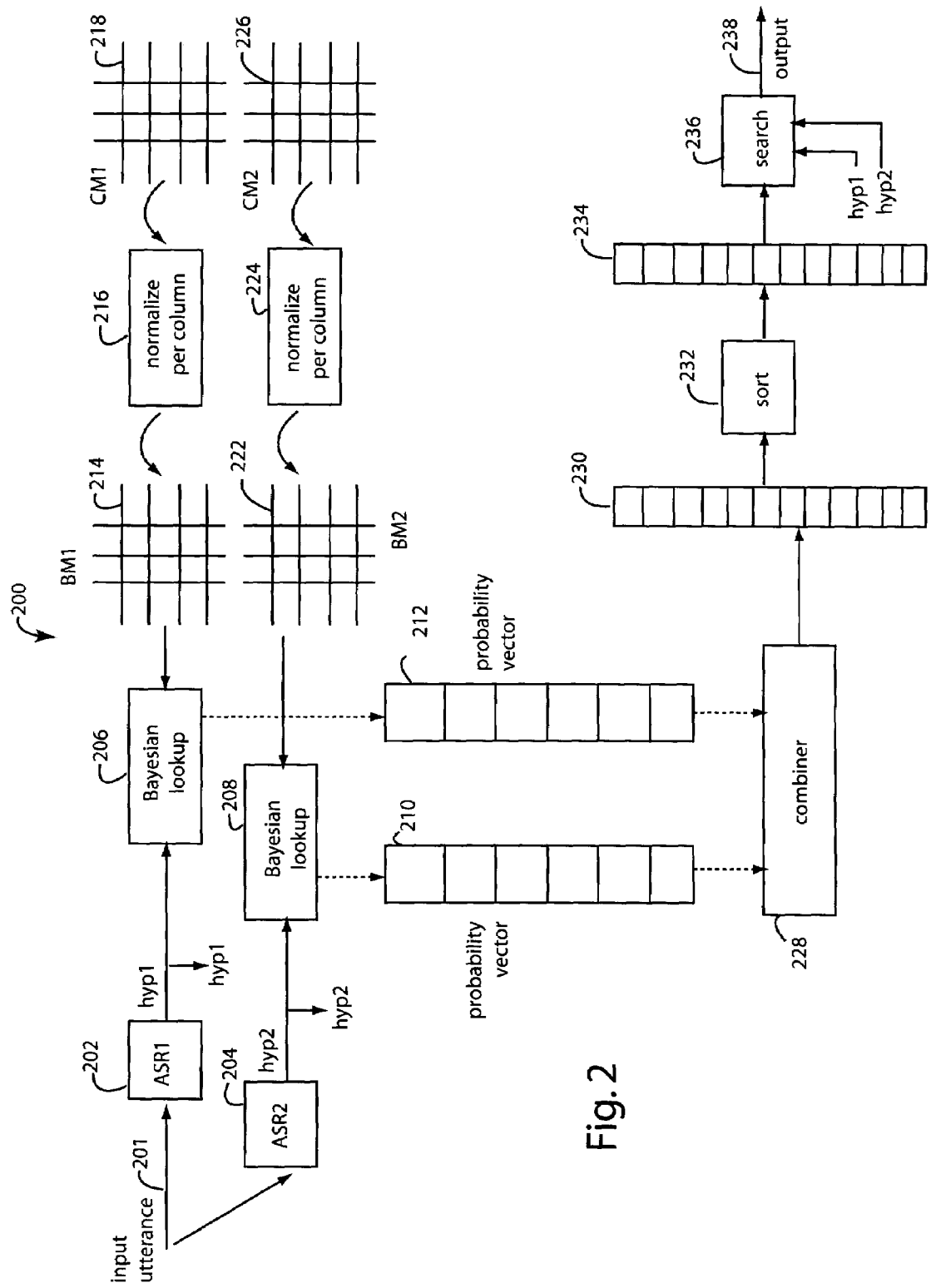
FIG. 2 is a functional block diagram of a second speech recognition system embodiment of the present invention which uses a combined Bayesian ordering of hypothesis alternatives.

FIG. 2 illustrates a second speech recognition system embodiment of the present invention, and is referred to herein by the general reference numeral 200. The system 200 uses a combined Bayesian ordering of alternatives. It essentially combines respective columns from the confusion matrices of two automated speech recognition engines according to the individual hypotheses of each being true. So it can happen that if the second automated speech recognition engine says in its confusion matrix that a particular hypothesis of the first automated speech recognition engine is more probable than its own confusion matrix entry, such hypothesis will be adopted and output.

The system 200 comprises an utterance input 201, a first and a second automated speech recognition engine (ASR1) 202 and (ASR2) 204, a first and second Bayesian lookup function 206 and 208, and a first and second probability vector 210 and 212.

A first Bayesian matrix (BM1) 214 is loaded by a normalizing generator 216 that uses information from a first confusion matrix (CM1) 218. A second Bayesian matrix (BM2) 222 is loaded by a second normalizing generator 224 that uses information from a second confusion matrix (CM2) 226. The CM1 218 and CM2 226 are loaded with test scores that are converted into probabilities column-by-column by normalizing generators 216 and 224. The row orders are preserved.

Consider Table-X, which represents a simple confusion matrix for CM1 218.

TABLE X

Confusion Matrix (CM1)

| | zero | one | two | three |
|---|---|---|---|---|
| zero | 100 | 0 | 0 | 1 |
| one | 2 | 400 | 2 | 0 |
| two | 0 | 3 | 200 | 6 |
| three | 3 | 5 | 3 | 250 |

The totals for each column are not the same, so it is meaningless to compare individual entries across columns. In order for a cross-column comparison to be valid, the individual columns need to be normalized, e.g., into Bayesian probabilities. Such Table-X would therefore be converted by normalizing generator 216 into that of Table-XI.

TABLE XI

Bayesian Matrix (BM1)

| | zero | one | two | three |
|---|---|---|---|---|
| zero | 0.952 | 0.000 | 0.000 | 0.004 |
| one | 0.019 | 0.980 | 0.010 | 0.000 |
| two | 0.000 | 0.007 | 0.976 | 0.023 |
| three | 0.029 | 0.012 | 0.015 | 0.973 |

The same can be done for the second recognition engine. Consider Table-XII, which represents a simple confusion matrix for CM2 226. It is slightly different from CM1 218 because ASR1 202 is a different engine than is ASR2 204. If hyp1=hyp2, then there is no ambiguity, and the output is obvious and not uncertain. But if hyp1≠hyp2, then a decision must be made on which hypothesis to favor and to output. The basis for the favoring, is what is most probable. That is why the confusion matrices are converted to probabilities and all comparisons an choices thereafter are done on the basis of probabilities.

TABLE XII

Confusion Matrix (CM2)

|  | zero | one | two | three |
|---|---|---|---|---|
| zero | 130 | 0 | 1 | 4 |
| one | 3 | 300 | 3 | 6 |
| two | 0 | 5 | 280 | 3 |
| three | 4 | 3 | 2 | 150 |

Such Table-XII would be converted by normalizing generator 224 into that of Table-XIII.

TABLE XIII

Bayesian Matrix (BM2)

|  | zero | one | two | three |
|---|---|---|---|---|
| zero | 0.949 | 0.000 | 0.003 | 0.025 |
| one | 0.022 | 0.974 | 0.010 | 0.037 |
| two | 0.000 | 0.016 | 0.979 | 0.018 |
| three | 0.029 | 0.010 | 0.007 | 0.920 |

The probability vectors 210 and 212 are individual columns from BM1 214 and BM2 222 that are selected by hyp1 and hyp2, respectively. These two are merged together into a single vector by a combiner 228, e.g., a combination probability vector 230. A sorter 232 processes this into a sorted vector 234 according to Bayesian probabilities, while preserving the meanings attached to each row.

The normalizing generators 216 and 224 are needed to eliminate any differences caused by unequal column totals between CM1 218 and CM2 226. A search engine 236 then determines an output 238 from the sorted vector 234. Essentially, sorted vector 234 is ordered according to the most likely true input, and a match between hyp1 first, or hyp2 second, will produce and output of either hyp1 or hyp2. Thus, the outputs of both ASR1 202 and ASR2 204 are tested against a Bayesian ordered combination of possibilities from the confusion matrices of the individual recognition engines.

Thus, if hyp1=zero, and hyp2=one, then Bayesian lookup 206 would select the first column, column "zero", for probability vector one (PV1) 210 from BM1 214 of Table-XI, e.g.,

TABLE XIV

PV1

|  | zero |
|---|---|
| zero | 0.952 |
| one | 0.019 |
| two | 0.000 |
| three | 0.029 |

Similarly, if hyp1=zero, and hyp2=one, then Bayesian lookup 208 would select the second column, column "one", for probability vector two (PV2) 212 from BM2 222 of Table-XIII, e.g.,

TABLE XV

PV2

|  | one |
|---|---|
| zero | 0.000 |
| one | 0.974 |
| two | 0.016 |
| three | 0.010 |

The combiner 228 then merges these into one vector, vector 230, e.g., as in Table-XVI,

TABLE XVI

| zero | 0.952 |
|---|---|
| zero | 0.000 |
| one | 0.019 |
| one | 0.974 |
| two | 0.000 |
| two | 0.016 |
| three | 0.029 |
| three | 0.010 |

The sorter 232 sorts this vector according to the probabilities, and produces sorted vector 234, e.g., as in Table-XVII,

TABLE XVII

| one | 0.974 |
|---|---|
| zero | 0.952 |
| three | 0.029 |
| one | 0.019 |
| two | 0.016 |
| three | 0.010 |
| two | 0.000 |
| zero | 0.000 |

A method embodiment of the present invention embedded in the search engine 236 of FIG. 2 comprises six steps. In a first step, a first entry in the sorted vector 234 is selected, e.g., "alt". In a second step, if Prob(alt)=0, then select output=hyp1 and exit. In a third step, hyp1 is compared with alt, and if equal then select output=hyp1 and exit. In a fourth step, hyp2 is compared with alt, and if equal then select output=hyp2 and exit. In a fifth step, a next alternative is selected from the alternatives vector, and it is now labeled "alt". A sixth step simply loops back to the second step to complete a loop process.

In operation, each confusion matrix column is individually normalized according to its Bayesian probability that the recognition output represents the true input. When an input utterance 201 is fed into each of the two recognition engines 202 and 204, they will individually produce independent hypotheses, e.g., hyp1 and hyp2. Each hypothesis is used by a lookup 206 and 208 to index into the corresponding Bayesian matrix and select a column vector, e.g., a Bayesian vector 210 and 212. The two selected vectors 210 and 212 are merged by combiner 228 into one combination vector 230. Such resulting vector is sorted by sorter 232 according to the Bayesian probabilities. Each cell in the alternatives vector will include the alternative hypothesis.

Prototypes of systems 100 and 200 were implemented and tested. A corpus of digits for telephony-based applications was used for recognizing spoken phone numbers, zip codes, money orders, and street addresses. Table-X summarizes the error types and the word error rates observed. In the Table, system 100 is referred to as "2-engine Type-I" and system

200 is referred to as "2-engine Type-II". The reference engine is mentioned as the first number between parentheses, for example, (1,2) in the table below means that ASR1 is the reference engine. Such results show that two-engine recognition systems with confusion matrices can outperform combinations of three recognition engines, in terms of a lower word error rate (WER).

TABLE X

Test Results

24017

| Number of Words ASR Engine | ASR 1 | ASR 2 | ASR 3 | ASR 4 | ASR 5 | Voting (1, 2, 3) | Voting (1, 2, 5) | Voting (1, 2, 4) | 2-engines (1, 2) Type II | 2-engines (2, 1) Type II | 2 engines (1, 2) Type I | 2 engines (2, 1) Type I |
|---|---|---|---|---|---|---|---|---|---|---|---|---|
| Substitutions | 233 | 280 | 1877 | 426 | 497 | 219 | 224 | 187 | 172 | 172 | 214 | 199 |
| Deletions | 337 | 265 | 1079 | 2246 | 1017 | 169 | 244 | 273 | 100 | 112 | 261 | 186 |
| Insertions | 164 | 275 | 839 | 903 | 571 | 244 | 196 | 133 | 360 | 358 | 262 | 317 |
| Word Error Rate (%) | 3.06 | 3.41 | 15.8 | 14.9 | 8.68 | 2.63 | 2.76 | 2.47 | 2.63 | 2.67 | 3.06 | 2.92 |

In the tests that were conducted, two commercially marketed automated speech recognition (ASR) engines were used, e.g., ASR1 and ASR2. A confusion matrix obtained for each engine is provided in Tables XI and XII.

TABLE XI

Confusion Matrix for ASR1

|  | zero | one | two | three | four | Five | six | seven | eight | nine | oh | Nothing |
|---|---|---|---|---|---|---|---|---|---|---|---|---|
| zero | 656 | 0 | 3 | 0 | 0 | 0 | 0 | 0 | 0 | 0 | 2 | 2 |
| one | 0 | 2582 | 0 | 0 | 9 | 3 | 0 | 1 | 1 | 6 | 7 | 47 |
| two | 2 | 0 | 3093 | 20 | 0 | 2 | 1 | 0 | 2 | 1 | 8 | 39 |
| three | 0 | 2 | 6 | 2632 | 1 | 1 | 0 | 0 | 1 | 0 | 1 | 16 |
| four | 0 | 2 | 0 | 0 | 2515 | 13 | 0 | 0 | 1 | 0 | 11 | 17 |
| five | 1 | 0 | 0 | 1 | 7 | 2326 | 0 | 1 | 0 | 2 | 1 | 25 |
| six | 0 | 0 | 0 | 0 | 2 | 2 | 2195 | 0 | 3 | 0 | 0 | 15 |
| seven | 1 | 0 | 0 | 0 | 1 | 0 | 1 | 2243 | 0 | 0 | 1 | 19 |
| eight | 0 | 0 | 3 | 13 | 1 | 3 | 4 | 1 | 2007 | 8 | 4 | 57 |
| nine | 0 | 7 | 1 | 0 | 0 | 4 | 1 | 0 | 0 | 1900 | 3 | 40 |
| oh | 25 | 3 | 3 | 0 | 5 | 2 | 0 | 5 | 1 | 5 | 1298 | 60 |
| Nothing | 2 | 7 | 12 | 8 | 7 | 22 | 5 | 4 | 22 | 9 | 66 | 0 |

TABLE XII

Confusion Matrix for ASR2

|  | zero | one | two | three | four | five | six | seven | eight | nine | oh | Nothing |
|---|---|---|---|---|---|---|---|---|---|---|---|---|
| zero | 659 | 0 | 1 | 0 | 0 | 0 | 0 | 0 | 0 | 0 | 0 | 3 |
| one | 0 | 2595 | 2 | 0 | 14 | 3 | 0 | 1 | 0 | 5 | 1 | 35 |
| two | 3 | 0 | 3097 | 9 | 1 | 0 | 1 | 0 | 10 | 2 | 5 | 40 |
| three | 0 | 1 | 16 | 2621 | 1 | 0 | 0 | 0 | 5 | 0 | 1 | 15 |
| four | 0 | 5 | 0 | 0 | 2515 | 7 | 0 | 0 | 0 | 0 | 12 | 20 |
| five | 0 | 1 | 0 | 0 | 3 | 2348 | 1 | 0 | 0 | 3 | 1 | 7 |
| six | 0 | 0 | 1 | 2 | 0 | 2 | 2187 | 1 | 11 | 1 | 1 | 11 |
| seven | 0 | 0 | 1 | 0 | 0 | 1 | 0 | 2249 | 0 | 3 | 2 | 10 |
| eight | 0 | 1 | 8 | 11 | 2 | 3 | 5 | 0 | 2018 | 5 | 1 | 47 |
| nine | 0 | 8 | 0 | 0 | 0 | 8 | 0 | 0 | 0 | 1927 | 4 | 9 |
| oh | 14 | 0 | 27 | 0 | 7 | 7 | 0 | 2 | 2 | 11 | 1256 | 81 |
| Nothing | 5 | 3 | 20 | 6 | 3 | 50 | 10 | 2 | 20 | 27 | 128 | 1 |

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A method for using exactly two speech recognition engines in automated speech recognition applications, the method comprising:

deriving first and second alternatives matrices from respective first and second confusion matrices that are associated with first and second automated speech recognition engines, wherein said alternatives matrices each include a set of vectors for each possible hypothesis output of said automated speech recognition engines in which the ground truth entries are uniformly ordered by probability;

cross checking each hypothesis output of said automated speech recognition engines with a first pair of said ground truth entries (alt1 and alt2) in said vectors, firstly to find a match with a hypothesis output (hyp1) of said first automated speech recognition engine, and secondly to find a match with a hypothesis output (hyp2) of said second automated speech recognition engine;

cross checking each hypothesis output of said automated speech recognition engines with said ground truth entries in said vectors first to find a match with a hypothesis output (hyp1) of said first automated speech recognition engine, then if none to find a match with a hypothesis output (hyp2) of said second automated speech recognition engine;

incrementing and cross checking each hypothesis output of said automated speech recognition engines with a next pair of said ground truth entries (alt1 and alt2) in said vectors first to find a match with a hypothesis output (hyp1) of said first automated speech recognition engine, then to find a match with a hypothesis output (hyp2) of said second automated speech recognition engine;

setting an output to equal one of said hypothesis outputs of said automated speech recognition engines if a corresponding match was found in the steps of cross checking and incrementing; and adopting said hypothesis output of said first automated speech recognition engine if neither of the steps of cross checking and incrementing produce a match.

2. The method of claim 1, wherein:

the step of deriving is such that each confusion matrix is split into its constituent columns, each column is separately sorted according to its cell-value confusion counts, said cell-value confusion counts are replaced by their corresponding row labels, and the individual columns are then rejoined together to form said alternatives matrices.

3. The method of claim 1, wherein:

the step of cross checking each hypothesis output of said automated speech recognition engines is such that a pointer is set up in a program loop to index a first pair of entries in a row of said alternatives vector.

4. A speech recognition system with independent ordering of hypothesis alternatives, comprising:

an input for receiving utterances;

a first automated speech recognition (ASR1) engine connected to receive said utterances from the input and to output a respective first hypothesis (hyp1);

a second automated speech recognition (ASR2) engine connected to receive said utterances from the input and to output a respective second hypothesis (hyp2);

a first alternative matrix and lookup connected to receive said hyp1 as a first lookup table index and for providing a first alternatives vector;

a second alternative matrix and lookup connected to receive said hyp2 as a second lookup table index and for providing a second alternatives vector; and an alternatives search processor for comparing said hyp1 to an ordered sequence of individual values in said second alternatives vector, and for comparing said hyp2 to a matching ordered sequence of individual values in said first alternatives vector, and for expressing a preference of hyp1 or hyp2 as a correct machine interpretation of said utterances.

5. The system of claim 4, wherein the first and second alternative matrices are generated from respective confusion matrices.

6. A method for using exactly two speech recognition engines in automated speech recognition applications, the method comprising:

deriving normalized first and second Bayesian probability matrices from respective first and second confusion matrices that are associated with first and second automated speech recognition (ASR) engines, wherein said normalized Bayesian probability matrices each include a set of vectors for each possible hypothesis output of said automated speech recognition engines;

lookup indexing each Bayesian matrix corresponding to each ASR to select a respective pair of column vectors;

merging said respective pair of column vectors into a single probability vector;

sorting said single probability vector according to the Bayesian probabilities to produce a sorted Bayesian probability vector;

program looping through said sorted Bayesian probability vector to find a match with either of said ASR engines; and setting an output to equal one of said hypothesis outputs of said ASR engines if a corresponding match was found in the step program looping; and otherwise, adopting said hypothesis output of said first automated speech recognition engine and setting said output to that if the step program looping does not produce a match.

7. A speech recognition system, comprising:

a first and a second automated speech recognition (ASR) engine connected in parallel to receive a speech input and each having respective independent hypotheses outputs;

a normalizing engine providing for normalized first and second Bayesian probability matrices from respective first and second confusion matrices that are associated with first and second automated speech recognition (ASR) engines, wherein said normalized Bayesian probability matrices each include a set of vectors for each possible hypothesis output of said automated speech recognition engines;

a lookup processor providing for an indexing of each Bayesian matrix corresponding to each ASR to select a respective pair of column vectors;

a combining mechanism providing for a merger of said respective pair of column vectors into a single probability vector;

a sorting mechanism for ordering said single probability vector according to Bayesian probabilities to produce a sorted Bayesian probability vector;

a computer mechanism for program looping through said sorted Bayesian probability vector to find a match with either of said ASR engine hypotheses outputs; and an output for signaling one of said hypothesis outputs of said ASR engines as a most probable if a corresponding match was found in the step program looping; and a default mechanism for adopting the hypothesis output of the first ASR engine and setting the output to that if said computer mechanism for program looping does not produce a match.

* * * * *

UNITED STATES PATENT AND TRADEMARK OFFICE
CERTIFICATE OF CORRECTION

PATENT NO. : 7,149,689 B2
APPLICATION NO. : 10/354415
DATED : December 12, 2006
INVENTOR(S) : Sherif Yacoub It is certified that error appears in the above-identified patent and that said Letters Patent is hereby corrected as shown below:

On the face page, in field (73), in "Assignee", in column 1, line 2, delete "LP.," and insert -- L.P., --, therefor.

Signed and Sealed this

Eighth Day of December, 2009

David J. Kappos
*Director of the United States Patent and Trademark Office*